US006371610B1

(12) United States Patent
Nakamura et al.

(10) Patent No.: US 6,371,610 B1
(45) Date of Patent: Apr. 16, 2002

(54) INK-JET PRINTING METHOD AND INK-JET PRINTED CLOTH

(75) Inventors: Syungaku Nakamura; Naohiro Oobayashi; Akiyo Nomura, all of Fukui (JP)

(73) Assignee: Seiren Co., Ltd., Fukui (JP)

( * ) Notice: Subject to any disclaimer, the term of this patent is extended or adjusted under 35 U.S.C. 154(b) by 0 days.

(21) Appl. No.: 09/493,632

(22) Filed: Jan. 28, 2000

(51) Int. Cl.[7] .............................. B41J 2/01; B41J 3/407; G01D 11/00

(52) U.S. Cl. ......................... 347/101; 347/100; 347/105; 347/106

(58) Field of Search .................................. 347/101, 106, 347/100, 105, 103, 104, 102

(56) References Cited

U.S. PATENT DOCUMENTS 6,036,307 A * 4/1997 Hakamada et al. ......... 347/106

* cited by examiner

*Primary Examiner*—John Barlow
*Assistant Examiner*—Charles W. Stewart, Jr.
(74) *Attorney, Agent, or Firm*—Dilworth & Barrese LLP

(57) ABSTRACT

An ink-jet printing method of applying an ink containing dyes onto cloth without need for a subsequent step of washing the cloth to produce printed cloth excellent in water, weather and abrasion resistance and dye-specific color brilliancy as well as soft to the touch. In the ink-jet printing method, the cloth is treated with an ink acceptor solution containing an ink holding agent and a synthetic resin having a glass transition temperature from 60 to 150° C. before it is subjected to ink-jet printing and then wet-heat treatment.

16 Claims, No Drawings

INK-JET PRINTING METHOD AND INK-JET PRINTED CLOTH

FIELD OF THE INVENTION

This invention relates to ink-jet printing method and ink-jet printed cloth, and more particularly to an ink-jet printing method suited to the production of printed cloth for use in applications such as large-sized screens, banners and displays requiring to be resistant to water and weather, and ink-jet printed cloth produced by said method.

BACKGROUND OF THE INVENTION

Conventionally, paper, resin film and other similar materials have been used as printing sheets for advertisements, PR and decorations. When used for such purposes, paper has an advantage in providing full-color brilliant images, but has the disadvantages of low strength with poor resistance to tear and crease, as well as low water resistance, presenting a problem of limiting its use to indoor applications such as copying and printing paper unless it is processed somehow for improvement of its such physical properties.

Film may be used for similar purposes, whether indoors or outdoors, but when used outdoors, it has a problem with its structure, causing it to undergo direct influence of wind. In addition, as in the case of paper, it has the disadvantages of poor resistance to crease, tear and scratch, causing it to fail to be good for practical use.

In the meantime, ink-jet printing technology for cloth has recently made such great progress as to produce large-size full-color images, attracting wide attention from the business circles involved in advertisements, PR and decorations.

Under these circumstances, there has been increased demand for printed cloth for use in applications such as large-sized screens, banners and displays requiring color brilliancy and water/weather resistance.

Notwithstanding the above, the production of printed cloth, generally consisting of application of coloring material (dyes, pigments or inks) onto cloth (by various methods including ink-jet printing method), fixation of the coloring material into the cloth for color development, washing of the cloth for removal of any unfixed coloring material, its drying and finishing, has conventionally involved such a long and complicated process, presenting the problem that it cannot be produced in a short time at a low cost. To solve this problem, various attempts have been made at simplifying or reducing the production process by omitting some of the steps involved in it, especially the washing step imposing large loads on it such as labor, time, water and heat.

However, the washing step is indispensable to the production process, especially in order to provide the printed cloth with high color fastness and color brilliancy. The omission of this step from the production process causes the cloth to be finished with incomplete removal of the ink holding agent and/or unfixed coloring materials left on it, which, when exposed to water, migrate, creating problems such as bleeding.

In order to solve these problems, JP-A-60-75692 discloses the use of a disperse dye containing a dispersing agent at a concentration of 1 to 40% relative to its coloring ingredient and JP-A-60-75693 discloses the use of a dye dissolving liquid mainly composed of organic solvent ranging in boiling point from 40 to 160° C. for dyeing cloth without washing process. However, these dyeing methods have problems with the dye dispersion and dissolution, respectively, causing them to fail to come into practical use.

A similar dyeing method is also disclosed in JP-A-61-31469 in which a disperse dye containing dye dispersing and water repelling agents at a concentration of 5 to 50% relative to its coloring ingredient is used. However, this dyeing method involves a problem of non-uniform distribution of the water repelling agent over the cloth, which causes the ink to fail to penetrate into it uniformly with resultant unevenness of its dyeing, preventing it from being obtained as marketable printed goods.

To solve this problem, JP-A-4-270679 discloses a method involving the coating of cloth with a urethane resin followed by coagulation in water.

However, this method only provides cloth with the same level of color brilliancy and water resistance as obtained with the conventional methods, and is far from coming into practical use in such applications as require cloth-specific feel and strength.

OBJECTS OF THE INVENTION

It is therefore an object of the present invention to provide an ink-jet printing method of applying an ink containing dyes onto cloth without need for a subsequent step of washing the cloth to produce printed cloth excellent in water-, weather- and abrasion-resistance and dye-specific color brilliancy as well as soft to the touch, and ink-jet printed cloth produced by said method.

SUMMARY OF THE INVENTION

With the above object in view, the present invention has the methods described below and set forth in the claims hereto appended:

Firstly, the present invention resides in an ink-jet printing method of applying an ink containing dyes onto cloth, which comprises treating cloth with an ink acceptor solution containing an ink holding agent and a synthetic resin having a glass transition temperature ranging from 60 to 150° C., subjecting the treated cloth to ink-jet printing and then subjecting the printed cloth to a wet-heat treatment.

Secondly, the present invention resides in the method mentioned above, in which said synthetic resin is at least one polymer selected from polyacrylic acid, polymethyl methacrylate, polystyrene, polyacrylonitrile, and polyvinyl acetate.

Thirdly, the present invention resides in the method mentioned above, in which said wet-heat treatment is performed at a temperature of 150 to 190° C.

Fourthly, the present invention is ink-jet printed cloth produced by the ink-jet printing method described in the method mentioned above.

PREFERRED EMBODIMENTS OF THE INVENTION

Preferred embodiments of the present invention are described in detail as follows:

The ink holding agents referred to in the present invention include carboxymethylcellulose, sodium alginate, guar gum, locust bean gum, gum Arabic, crystal gum, methylcellulose, polyacrylamide, starch, sodium polyacrylate, sodium polystyrene sulfonate, hydroxyethylcellulose, polyvinyl alcohol and other water-soluble polymers. Among them, however, carboxymethylcellulose or sodium alginate, or a mixture of both is particularly preferable for use in the invention in terms of providing the resultant printed cloth with color depth, high color fastness and brilliancy.

The cloth referred to in the present invention includes any and all types of fabrics such as woven, knitted, non-woven and braided ones. Among them, woven fabric is particularly preferable for use in the invention.

The material of which the cloth is composed includes polyester such as polyethylene terephthalate and polybutylene terephthalate, polyamide such as nylon, wool and silk, cellulose such as cotton and rayon, and acetate, and blends thereof. Among them, polyester is particularly preferable for use in the invention because it is excellent in structural strength (such as directionality, stretching property, compressibility and dimensional stability), mechanical strength (tensile strength, elongation resistance, tear strength, rupture strength and impact strength) and endurance strength (such as abrasion resistance, fatigue resistance, heat resistance, chemical resistance and mildew resistance).

The synthetic resin ranging in glass transition temperature from 60 to 150° C. referred to in the present invention includes polymethyl methacrylate, polystyrene, polyvinyl chloride, polyacrylonitrile, polyacylic acid, acrylonitrile-styrene resin, acrylonitrile-butadiene-styrene resin, methyl methacrylate-styrene copolymer, polyvinyl acetate and poly (meth) acrylate. Among then, synthetic resin ranging in glass transition temperature from 70 to 130° C. is preferable for use in the invention. More preferable for this purpose is synthetic resin ranging in glass transition temperature from 80 to 110° C., which can be used individually or as a mixture thereof.

The use of synthetic resin, the glass transition temperature of which is 60° C. or below, for this purpose, due to its being close to room temperature, causes the resin films resultantly formed on the cloth to stick to each other, causing a problem referred to as "blocking". When synthetic resin, the glass transition temperature of which is 150° C. or above, is used for this purpose, it will cause a problem of the resultant printed cloth becoming hard to the touch.

The above-mentioned resin should be preferably applied to a cloth to be ink-jet printed at a concentration of 0.1 to 30% by weight for the following reason; the resin applied to the cloth at a concentration of less than 0.1% by weight is insufficient to cover its surface completely, failing to prevent the dyes and water-soluble polymer from migrating to or dissolving in water, while the resin applied to the cloth at a concentration of more than 30% by weight cannot be expected to become more effective in increasing its performance, but only causing it to become harder to the touch.

The ink acceptor solution used in the present invention to treat a cloth to be ink-jet printed can be formulated optionally by addition of a flame retardant, ultraviolet absorber, reduction inhibitor, oxidation inhibitor, pH controller, hydrotrope, anti-foaming agent, penetrant, micro-pore forming agent and/or other similar agents at proper concentrations.

The flame retardant referred to in the invention includes halogen based compounds such as hexabromocyclododecane, tetrabromobisphenol, chlorinated paraffin and decabromodiphenylether, phosphor based compounds such as tricresyl phosphate, chlorophosphate and triethylphosphate and inorganic compounds such as antimony trioxide, zinc oxide and boric acid.

The ultraviolet absorber referred to in the invention includes benzotriazole and benzophenone.

The reduction inhibitor referred to in the invention includes nitrobenzenesulfonate and benzene-sulfonate derivatives.

The oxidation inhibitor referred to in the invention includes hindered amine and hindered phenol.

The pH controller referred to in the invention includes acidifying compounds such as malic acid, citric acid, acetic acid, ammonium sulfate and ammonium citrate, and alkalizing compounds such as sodium hydrogen carbonate, sodium carbonate and sodium hydroxide.

The hydrotope referred to in the invention includes urea, polyethylene glycol and thiourea.

The anti-foaming agent referred to in the invention includes lower alcohol such as isopropanol, ethanol and n-butanol, organic polar compounds such as oleic acid and polypropylene glycol, and silicone resin.

The penetrant referred to in the invention includes anionic surfactants such as sodium dodecylbenzene sulfonate, sodium lauryl sulfate ester and butyl oleate, and nonionic surfactants such as nonylphenol EO and laurylalcohol EO.

The micro-pore forming agent referred to in the invention includes a liquid insoluble or hardly soluble in water with a low boiling point of 105 to 200° C. homogeneously emulsified or dispersed in water as fine particles [, which] can be preferably used in the present invention. The low-boiling liquid referred to in the invention includes hydrocarbon such as toluene and xylene, halogenated hydrocarbon such as perchloroethylene, monochlorobenzene, dichloropentane, butyl acetate and butyl acrylate.

The application of the above-mentioned resin solution to a cloth to be ink-jet printed can be made by padding, spraying, dipping, coating, laminating, gravure, ink-jet or any other method available for such application, among which padding is preferable for the invention, which allows the resin to be applied to the cloth, not causing a problem with its touch, as well as not filling the space between its fibers thoroughly, but covering their individual surfaces to allow it to be used outdoors without being subject to wind pressure.

The cloth thus treated with the above-mentioned ink acceptor solution is preferably subjected to drying prior to its ink-jet printing. The drying of the cloth is normally carried out at a temperature of 80 to 150° C. for 0.5 to 60 minutes, preferably at a temperature of 100 to 120° C. for 1 to 20 minutes, for the following reason; the drying of the cloth at a temperature below 80° C. involves a problem of difficulty in its efficient drying, while the drying of the cloth at a temperature above 150° C. presents a problem of causing the film formation of the resin on it to proceed to such an excessive extent that the film to be formed on it when subsequently subjected to wet heat treatment becomes weak, resulting in a drop in its water resistance; the drying of the cloth for less than 0.5 minute causes a problem of it undergoing variations in the color development of the dyes and the film formation of the resin, while the drying of the cloth for more than 60 minutes presents a problem of the water-soluble polymer applied to it becoming degraded.

The ink-jet printing on the cloth thus treated can be carried out using any of the methods available for such printing in various types, including continuous type such as charge modulating, micro dotting, electrification jet controlling or ink mist, stemme type (two-component), pulse jet type (one-component), bubble jet type, and on-demand type such as electrostatic suction.

The dyestuffs that can be used as ink for the ink-jet printing include water-insoluble dyes such as disperse dyes, oil-soluble dyes and pigments and water-soluble dyes such as cationic dyes, reactive dyes, direct dyes and fluorescent dyes, which are to be selected according to the type of cloth to be ink-jet printed.

In addition, the ink can be formulated as required by addition of a dispersant, antifoamer, penetrant, pH controller and/or other additives.

The cloth thus ink-jet printed is then subjected to wet-heat treatment to cause the dyes on it to develop color and the synthetic resin on it to form a film. The film thus formed on the cloth will not prevent the dyes from migrating into the fibers and the fibers from holding the dyes.

The wet-heat treatment of the cloth is normally carried out at a temperature of 150 to 190° C. for 0.5 to 60 minutes, preferably at a temperature of 160 to 180° C. for 5 to 30 minutes, for the following reason; the wet-heat treatment of the cloth at a temperature below 150° C. presents a problem of the dyes on it failing to develop color properly, while the wet-heat treatment of the cloth at a temperature above 190° C. causes a problem of it and the water-soluble polymer on it becoming yellowed or the resin on it becoming hardened; the wet-heat treatment of the cloth for less than 0.5 minute causes a problem of it undergoing variations in the color development of the dyes and the film formation of the resin, while the wet-heat treatment of the cloth for more than 60 minutes presents a problem of the dyes and water-soluble polymer on it becoming degraded.

The wet-heat treatment of an ink-jet printed cloth coated with a synthetic resin covered by the present invention at a specific temperature higher than the resin's glass transition temperature allows the resin to form a film on the fiber surface of the cloth, eliminating the need for its subsequent washing to provide it with high weather resistance.

The application of the ink acceptor solution of a cloth to be ink-jet printed, the ink-jet printing on the cloth and its wet-heat treatment as described above with its final drying allows it to be obtained as printed cloth, the provision of which is part of the object of the present invention.

The present invention will be more clearly understood with reference to the following examples:

EXAMPLE 1

An ink acceptor solution formulated as follows was applied to a polyester 100% plain weave fabric by padding.

| ① Ink acceptor solution | |
|---|---|
| Water-soluble polymer: Cellogen PR (Daiichi Kogyo Seiyaku Co., Ltd. made carboxy methylcellulose based compound) | 2 parts |
| Synthetic resin: Methyl methacrylate-styrene copolymer (Glass transition temperature: 105° C.) emulsion | 3 parts |
| pH controller: Acetic acid | 1 part |
| Water: | 94 parts |

The fabric was dried at 130° C. for two minutes and then printed with a full-color image using the following ink recipe by an on-demand type serial scanning ink-jet printing system under the following printing condition.

| ② Ink recipe | |
|---|---|
| Disperse dye | 5 parts |
| Lignin sulfonate (anionic surface active agent) | 4 parts |
| Shin-Etsu Silicone KM-70 (Shin-Etsu Chemical Co., Ltd. made antifoaming agent) | 0.05 part |
| Ethylene glycol | 10 parts |
| Silicic acid | 0.1 part |
| Deionized water | 80 parts |

The above ink recipe was used to prepare four color inks—yellow, red, blue and black based on C.I. Disperse Yellow 93, C.I. Disperse Red 92, C.I. Disperse Blue 87 and C.I. Disperse Black 1, respectively.

③ Ink-jet printing condition

Jet nozzle diameter: 100 μm

Driving voltage: 107V

Frequency: 5 KHz

Resolution: 360 dpi (4×4 matrix)

The fabric thus ink-jet printed was then subjected to wet-heat treatment under superheated steam at 175° C. for seven minutes without its subsequent washing. The fabric was measured for its color fastness properties. The results of the measurement are shown in Table 1.

EXAMPLE 2

An ink acceptor solution formulated as follows was applied to a polyester 100% plain weave fabric by padding.

| ① Ink acceptor solution | |
|---|---|
| Water-soluble polymer: PVA205 (Kuraray Co., Ltd. made polyvinyl alcohol based compound) | 2 parts |
| Synthetic resin: Polymethyl methacrylate (Glass transition temperature: 105° C.) emulsion | 3 parts |
| pH controller: Acetic acid | 1 part |
| Water: | 94 parts |

Then, the fabric was dried and printed with a full-color image under the same condition as in Example 1 for its drying, ink recipe, ink-jet printing and wet-heat treatment without its subsequent washing. The fabric was measured for its color fastness properties. The results of the measurement are shown in Table 1.

EXAMPLE 3

An ink acceptor solution formulated as follows was applied to a polyester 100% plain weave fabric by coating.

| ① Ink acceptor solution | | |
|---|---|---|
| Water-soluble polymer: Duck algin NSPL (Kibun Foods Chemifa Co., Ltd. made sodium alginate based compound) | | 3 parts |
| Synthetic resin: Acrylonitrile-butadiene-styrene copolymer (Glass transition temperature: 120° C.) emulsion | | 3 parts |
| Micro-pore foaming agent: * | | 15 parts |
| * Mineral turpentine (Meisei Chemical Works Ltd.) | 50% | |
| Aroemulphor HS (Meisei Chemical Works Ltd.) | 2% | |
| Water | 48% | |
| pH controller: Acetic acid | | 1 part |
| Water: | | 78 parts |

The fabric was dried at 130° C. for two minutes and then ink-jet printed by an on-demand type serial scanning ink jet printing system under the same ink recipe and printing condition as in Example 1.

The fabric thus ink-jet printed was subjected to wet-heat treatment under superheated steam at 175° C. for 20 minutes without its subsequent washing. The fabric was measured for its color fastness properties. The results of the measurement are shown in Table 1.

EXAMPLE 4

An ink acceptor solution formulated as follows was applied to a polyester 100% plain weave fabric by padding.

| ① Ink acceptor solution | |
|---|---|
| Water-soluble polymer: Cellogen 5A (Daiichi Kogyo Seiyaku Co., Ltd. made carboxy methylcellulose based compound) | 2 parts |
| Synthetic resin: Styrene-acrylate copolymer (Glass transition temperature: 95° C.) emulsion | 3 parts |
| pH controller: Acetic acid | 1 part |
| Water: | 94 parts |

Then, the fabric was dried and printed with a full-color image under the same condition as in Example 1 for its drying, ink recipe, ink-jet printing and wet-heat treatment without its subsequent washing. The fabric was measured for its color fastness properties. The results of the measurement are shown in Table 1.

EXAMPLE 5

An ink acceptor solution formulated as follows was applied to a cotton 100% plain weave fabric by coating.

| ① Ink acceptor solution | |
|---|---|
| Water-soluble polymer: C-118 (Kuraray Co., Ltd. made polyvinyl alcohol based compound) | 4 parts |
| Synthetic resin: Styrene-acrylate copolymer (Glass transition temperature: 95° C.) emulsion | 3 parts |
| Water: | 93 parts |

The fabric was dried at 130° C. for two minutes and then printed with a full-color image using the following ink recipe by an on-demand type serial scanning ink-jet printing system under the following printing condition.

| ② Ink recipe | |
|---|---|
| Reactive dye | 10 parts |
| Deionized water | 90 parts |

The above ink recipe was used to prepare four color inks—yellow, red, blue-and black based on C.I. Reactive Yellow 85, C.I. Reactive Red 24, C.I. Reactive Blue 176 and C.I. Reactive Black 8, respectively.

③ Ink-jet printing condition

Jet nozzle diameter: 100 μm

Driving voltage: 107V

Frequency: 5 KHz

Resolution: 360 dpi (4×4 matrix)

The fabric thus ink-jet printed was then subjected to wet-heat treatment under superheated steam at 175° C. for seven minutes without its subsequent washing. The fabric was measured for its color fastness properties. The results of the measurement are shown in Table 1.

COMPARATIVE EXAMPLE 1

An ink acceptor solution formulated as follows was applied to the same plain weave fabric as in Example 1 by padding.

| ① Ink acceptor solution | |
|---|---|
| Water-soluble polymer: Cellogen PR (Daiichi Kogyo Seiyaku Co., Ltd. made carboxy methylcellulose based compound) | 2 parts |
| Water: | 98 parts |

The fabric was dried at 130° C. for two minutes and then ink-jet printed by an on-demand type serial scanning ink jet printing system under the same ink recipe and printing condition as in Example 1.

The fabric thus ink-jet printed was subjected to wet-heat treatment under the same condition as in Example 1 without its subsequent washing. The fabric was measured for its color fastness properties. The results of the measurement are shown in Table 1.

COMPARATIVE EXAMPLE 2

An ink acceptor solution formulated as follows was applied to the same plain weave fabric as in Example 1 by coating.

| ① Ink acceptor solution | |
|---|---|
| Water-soluble polymer: Duck algin NSPL (Kibun Foods Chemifa Co., Ltd. made sodium alginate based compound) | 3 parts |
| Water: | 97 parts |

The fabric was dried at 130° C. for two minutes and then ink-jet printed by an on-demand type serial scanning ink jet printing system under the same ink recipe and printing condition as in Example 1.

The fabric thus ink-jet printed was subjected to wet-heat treatment under the same condition as in Example 1 without its subsequent washing. The fabric was measured for its color fastness properties. The results of the measurement are shown in Table 1.

COMPARATIVE EXAMPLE 3

An ink acceptor solution formulated as follows was applied to the same plain weave fabric as in Example 1 by padding.

| ① Ink acceptor solution | |
|---|---|
| Water-soluble polymer: Cellogen PR (Daiichi Kogyo Seiyaku Co., Ltd. made carboxy methylcellulose based compound) | 2 parts |
| Synthetic resin: Polyethyl methacrylate (Glass transition temperature: 45° C.) emulsion | 3 parts |
| pH controller: Acetic acid | 1 part |
| Water: | 94 parts |

The fabric was dried at 130° C. for two minutes and then ink-jet printed by an on-demand type serial scanning ink jet printing system under the same ink recipe and printing condition as in Example 1.

The fabric thus ink-jet printed was subjected to wet-heat treatment under the same condition as in Example 1 without its subsequent washing. The fabric was measured for its color fastness properties. The results of the measurement are shown in Table 1.

TABLE 1

| | Rubbing fastness[1)] | | Light | Migration | Printed image |
|---|---|---|---|---|---|
| | Dry | Wet | fastness[2)] | fastness[3)] | quality[4)] |
| Example 1 | 5 | 4 | 4↑ | 5 | 5 |
| Example 2 | 5 | 4 | 4↑ | 5 | 5 |
| Example 3 | 5 | 4 | 3–4 | 4 | 4 |
| Example 4 | 5 | 4 | 4↑ | 5 | 5 |
| Example 5 | 4 | 3 | 3 | 4 | 5 |
| Comparative example 1 | 3 | 2 | 4↑ | 1 | 2 |
| Comparative example 2 | 3 | 2 | 4↑ | 1 | 1 |
| Comparative example 3 | 3 | 2 | 4↑ | 3 | 2 |

1) JIS L-0849

2) JIS L-0842

3) This measurement was made by immersing a specimen, cut from the printed fabric to be tested, in water at room temperature with a white cloth attached to the specimen for 24 hours, and judging the level of stain on the white cloth caused by the dyes migrated from the specimen to rate it on such a 5–1 scale as described below:

5: No stain

4: Slight stain

3: Moderate stain

2: Considerable stain

1: Excessive stain

4) This measurement was made by visually judging the ink-jet printed fabric regarding the level of the quality of the full-color image printed on it to rate it on such a 5–1 scale as described below:

5: Very good

4: Considerably good

3: Good

2: Slightly poor

1: Poor

What is claimed is:

1. An ink-jet printing method of applying an ink containing dyes onto cloth, which comprises treating the cloth with an ink acceptor solution containing an ink holding agent and a synthetic resin having a glass transition temperature ranging from 60 to 150° C., subjecting the treated cloth to ink-jet printing and then subjecting the printed cloth to a wet-heat treatment.

2. An ink-jet printing method claimed in claim 1, in which said synthetic resin is at least one polymer selected from polyacrylic acid, polymethyl methacrylate, polystyrene, polyacrylonitrile, and polyvinyl acetate.

3. An ink-jet printing method claimed in claim 1, in which said wet-heat treatment is performed at a temperature of 150 to 190° C.

4. An ink-jet printing method as claimed in claim 3, wherein said synthetic resin is at least one polymer selected from polyacylic acid, polymethylmethacrylate, polystyrene, polyacrylonitrile and polyvinyl acetate.

5. An ink-jet printing method as claimed in claim 3, wherein the step of wet-heat treatment is performed for 0.5 to 60 minutes.

6. An ink-jet printing method as claimed in claim 5, wherein said step of wet-heat treatment is performed at a temperature of 160 to 180° C. for 5 to 30 minutes.

7. Ink-jet printed cloth produced by an ink-jet printing method claimed in claim 1.

8. An ink-jet printing method as claimed in claim 1, wherein a step of washing is explicitly omitted subsequent to the wet-heat treatment, and the wet-treatment causes the synthetic resin to form a film on the cloth which permits dye to migrate into fibers of the cloth and the fibers retain the dye with the resultant cloth having excellent water-resistance, weather-resistance, abrasion-resistance, dye-specific color brilliancy as well as soft touch.

9. An ink-jet printing method as claimed in claim 1, wherein the ink-holding agent is selected from at least one of carboxymethylcellulose, sodium alginate, guar gum, locust bean gum, gum Arabic, crystal gum, methylcellulose, polyacrylamide, starch, sodium polyacrylate, sodium polystyrene sulfonate, hydroxyethylcellulose and polyvinyl alcohol.

10. An ink-jet printing method as claimed in claim 1, wherein said synthetic resin possesses a glass transition temperature ranging from 70 to 130° C.

11. An ink-jet printing method as claimed in claim 1, wherein said synthetic resin is applied to said cloth at a concentration of 0.1 to 30%.

12. An ink-jet printing method as claimed in claim 11, wherein the drying step is carried out at a temperature of 110 to 120° C. for 1 to 20 minutes.

13. An ink-jet printing method as claimed in claim 1, comprising the additional step of drying the cloth thus treated with the ink acceptor solution prior to the step of ink-jet printing, with the drying being carried out at a temperature of 80 to 150° C. for 0.5 to 60 minutes.

14. An ink-jet printed cloth produced by an ink-jet printing method of applying an ink containing dye onto the cloth, which comprises the steps of treating the cloth with an ink acceptor solution containing an ink holding agent and a synthetic resin having a glass transition temperature ranging from 60 to 150° C., after completing the cloth-treatment step, then subjecting the treated cloth to ink-jet printing, after completing the ink-jet printing step, then subjecting the printed cloth to a wet-heat treatment at a temperature of 150 to 190° C., and omitting washing of the cloth after completing the wet-heat treatment, said thus-produced printed cloth possessing a film of synthetic resin thereon which permits dye to migrate into fibers of the cloth and the fibers retain the dye, excellent water-resistance, weather-resistance and abrasion-resistance, dye-specific color brilliancy and soft touch.

15. An ink-jet printing method as claimed in claim 14, wherein said synthetic resin possess a glass transition temperature ranging from 80 to 110° C.

16. The ink-jet printed cloth as claimed in claim 14, possessing excellent rubbing fastness when dry and good rubbing fastness when wet (as measured by JIS L-0849), good to excellent light fastness (as measured by JIS L-0842), excellent migration fastness, i.e., no stain being exhibited by the measurement of immersing a specimen of the cloth in water at room temperature with a white cloth attached thereto for 24 hours, and judging level of stain on the white cloth caused by any dye migrating from the specimen and excellent printed image quality as measured by visually judging the ink-jet printed cloth regarding level of quality of full color image printed thereon.

* * * * *